Figure 1:
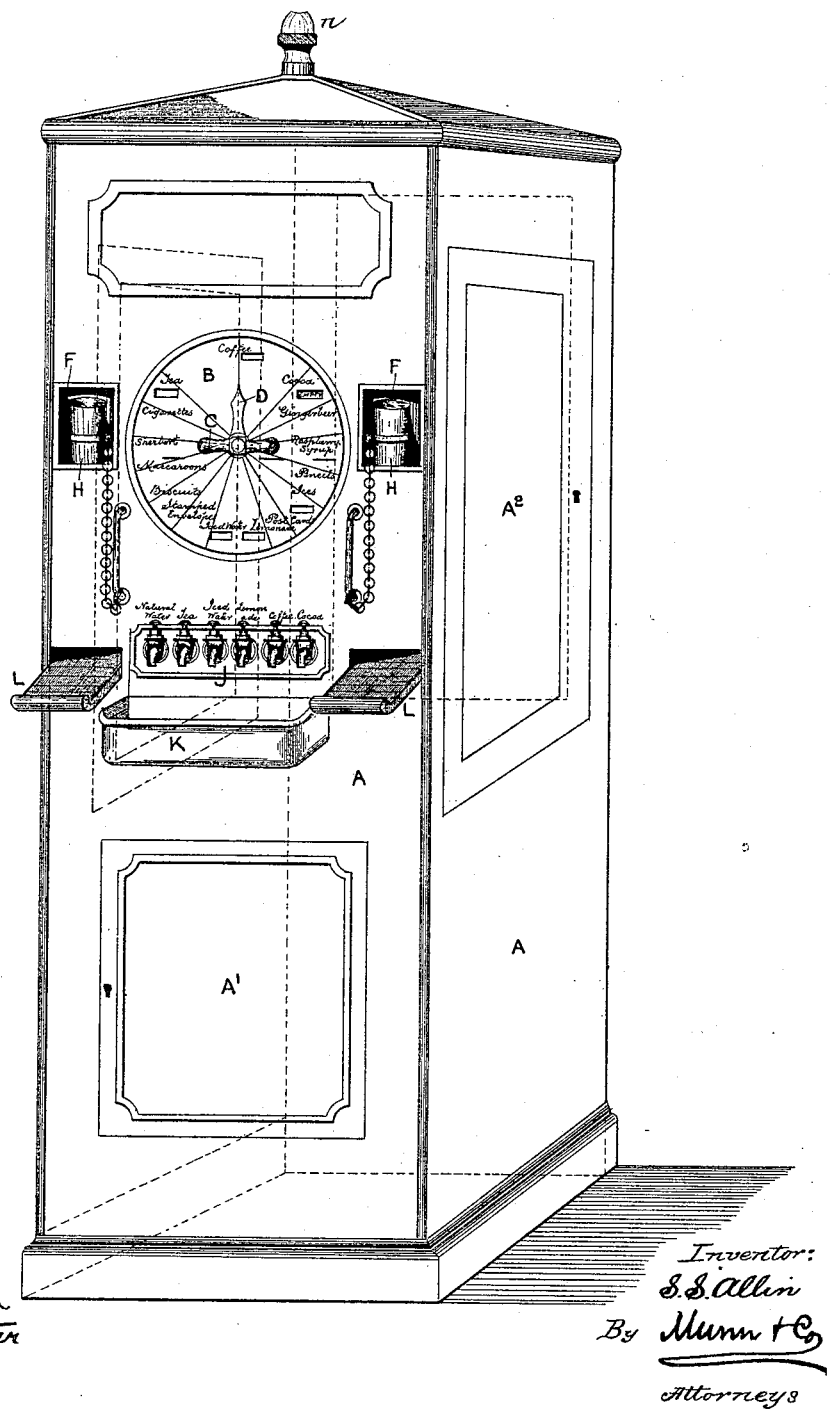

(No Model.)

13 Sheets—Sheet 1.

S. S. ALLIN.
AUTOMATIC MACHINE FOR DELIVERING ARTICLES IN EXCHANGE FOR COIN.

No. 449,024.

Patented Mar. 24, 1891.

Witnesses:
C. Sedgwick
J. M. Ritter

Inventor:
S. S. Allin
By Munn & Co.
Attorneys (No Model.) 13 Sheets—Sheet 2.

S. S. ALLIN.
AUTOMATIC MACHINE FOR DELIVERING ARTICLES IN EXCHANGE FOR COIN.

No. 449,024. Patented Mar. 24, 1891.

Witnesses:
C. Sedgwick
J. M. Ritter

Inventor:
S. S. Allin
By Munn & Co.
Attorneys.

(No Model.)  13 Sheets—Sheet 4.

S. S. ALLIN.
AUTOMATIC MACHINE FOR DELIVERING ARTICLES IN EXCHANGE FOR COIN.

No. 449,024. Patented Mar. 24, 1891.

Witnesses:
C. Sedgwick
J. M. Ritter

Inventor:
S. S. Allin
By Munn & Co.
Attorneys.

(No Model.) 13 Sheets—Sheet 5.
S. S. ALLIN.
AUTOMATIC MACHINE FOR DELIVERING ARTICLES IN EXCHANGE FOR COIN.

No. 449,024. Patented Mar. 24, 1891.

(No Model.) 13 Sheets—Sheet 6.

S. S. ALLIN.
AUTOMATIC MACHINE FOR DELIVERING ARTICLES IN EXCHANGE FOR COIN.

No. 449,024. Patented Mar. 24, 1891.

Witnesses:
C. Sedgwick
J. M. Ritter

Inventor:
S. S. Allin
By Munn & Co
Attorneys.

(No Model.) 13 Sheets—Sheet 7.

S. S. ALLIN.
AUTOMATIC MACHINE FOR DELIVERING ARTICLES IN EXCHANGE FOR COIN.

No. 449,024. Patented Mar. 24, 1891.

Witnesses:
C. Sedgwick
J. M. Ritter

Inventor:
S. S. Allin
By Munn & Co.
Attorneys.

(No Model.) 13 Sheets—Sheet 12.
S. S. ALLIN.
AUTOMATIC MACHINE FOR DELIVERING ARTICLES IN EXCHANGE FOR COIN.

No. 449,024. Patented Mar. 24, 1891.

Witnesses:
C. Sedgwick
J. M. Ritter

Inventor:
S. S. Allin
By Munn & Co
Attorneys (No Model.)  13 Sheets—Sheet 13.

S. S. ALLIN.
AUTOMATIC MACHINE FOR DELIVERING ARTICLES IN EXCHANGE FOR COIN.

No. 449,024.  Patented Mar. 24, 1891.

Witnesses:
E. Sedgwick
J. M. Ritter

Inventor:
S. S. Allin
By Munn & Co.
Attorneys.

UNITED STATES PATENT OFFICE.

SAMUEL SEALY ALLIN, OF LONDON, ENGLAND.

AUTOMATIC MACHINE FOR DELIVERING ARTICLES IN EXCHANGE FOR COIN.

SPECIFICATION forming part of Letters Patent No. 449,024, dated March 24, 1891.

Application filed October 12, 1888. Serial No. 287,877. (No model.) Patented in England January 21, 1888, No. 983, and November 14, 1888, No. 16,559; in Germany October 17, 1888, No. 47,912; in Belgium January 31, 1889, No. 84,832, and in France February 1, 1889, No. 195,800.

*To all whom it may concern:*

Be it known that I, SAMUEL SEALY ALLIN, a subject of the Queen of Great Britain, residing at 52 Woodstock Road, Bedford Park, W., London, in the county of Middlesex, England, have invented new and useful Improvements in Automatic Machines for Delivering Articles in Exchange for Coin, (on which patents have been granted to me in Great Britain, No. 983, dated January 21, 1888, and No. 16,559, dated November 14, 1888; in Germany, No. 47,912, dated October 17, 1888; in Belgium, No. 84,832, dated January 31, 1889, and in France, No. 195,800, dated February 1, 1889,) of which the following is a specification.

The main object of my invention is to effect such improvements in the construction of automatic machines used for delivering articles in exchange for coin as to render the said machines more generally useful by increasing the number of articles that can be dealt with and the range of prices, and by simplifying the releasing and delivering arrangements.

An important function of my improved machine is the sale of beverages, both hot and cold, and of sundry simple articles of food and small articles in general use.

Figure 2:
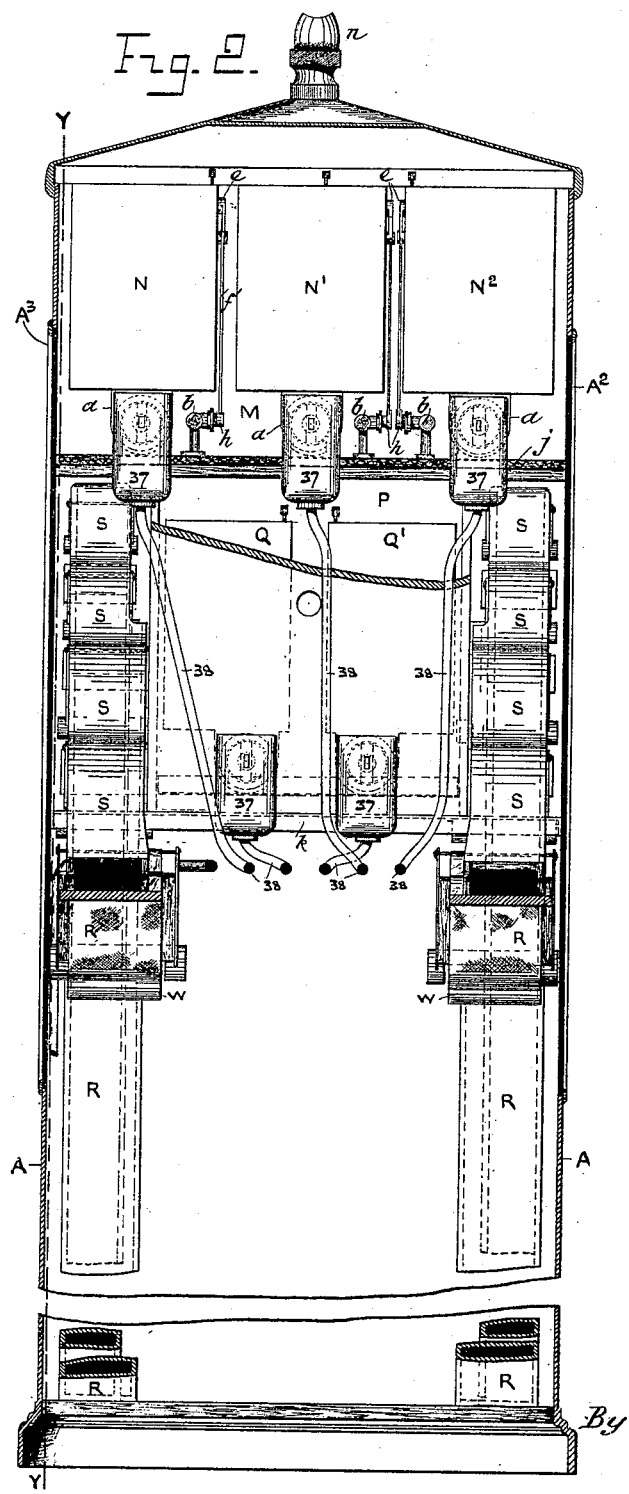
Figure 3:
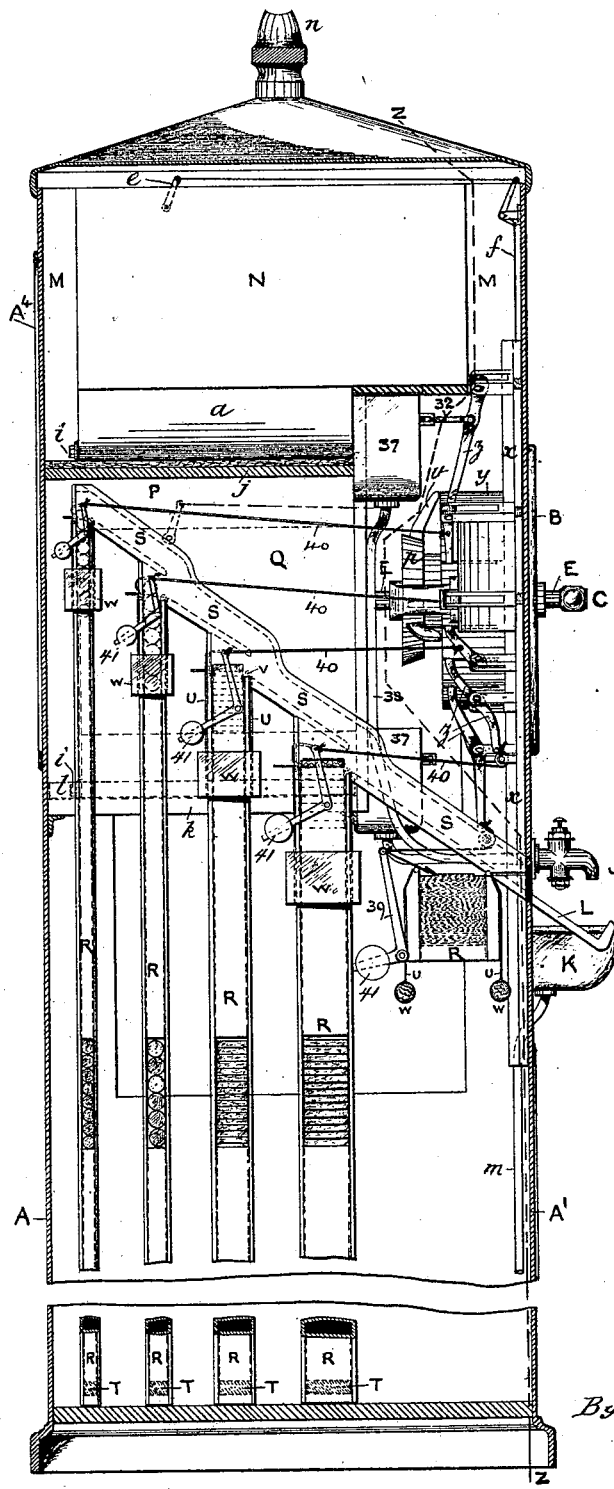
Figure 4:
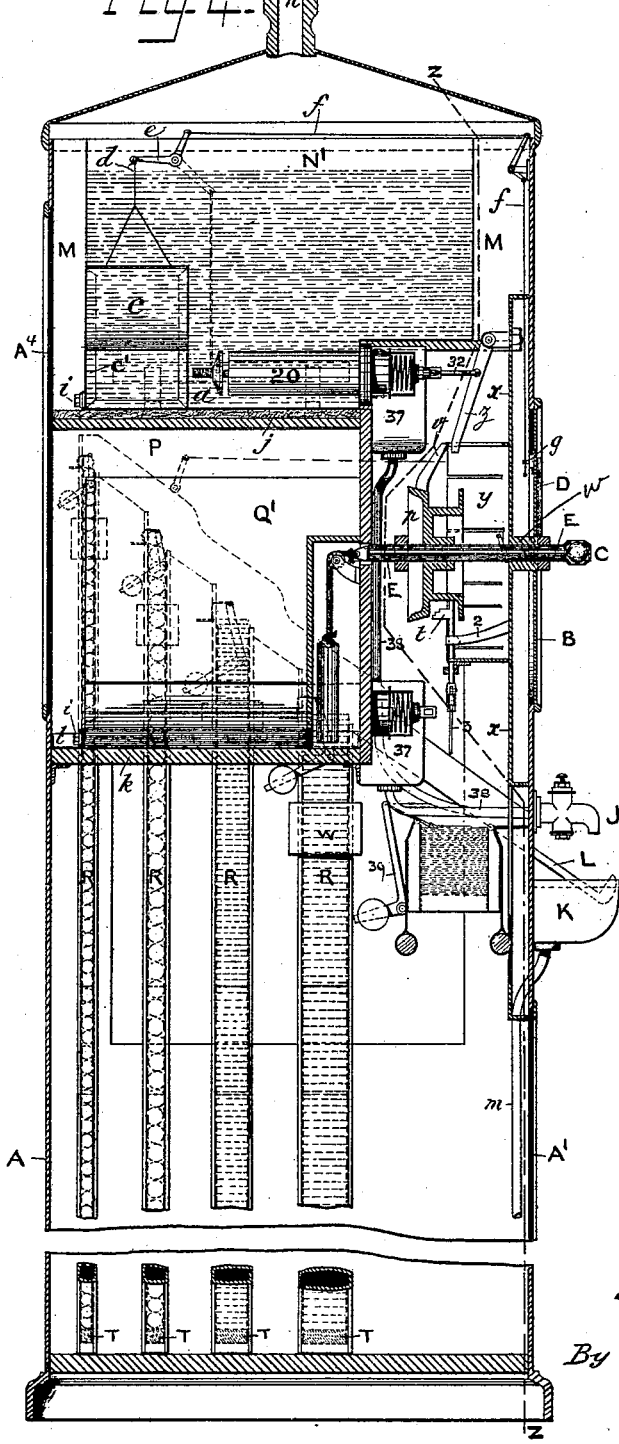
Figure 5:
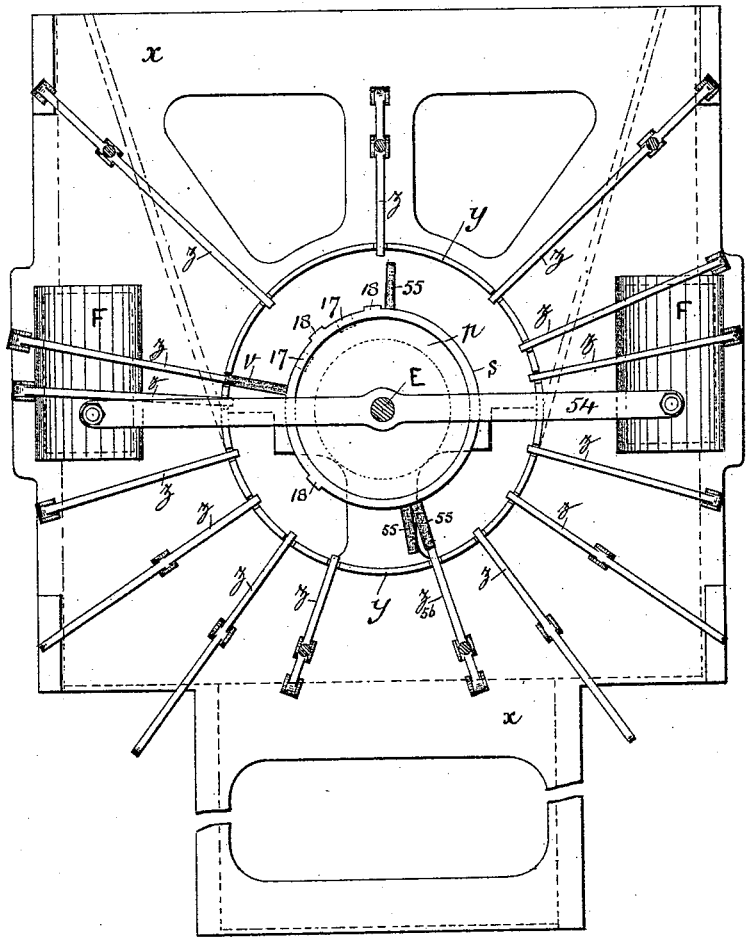
Figure 6:
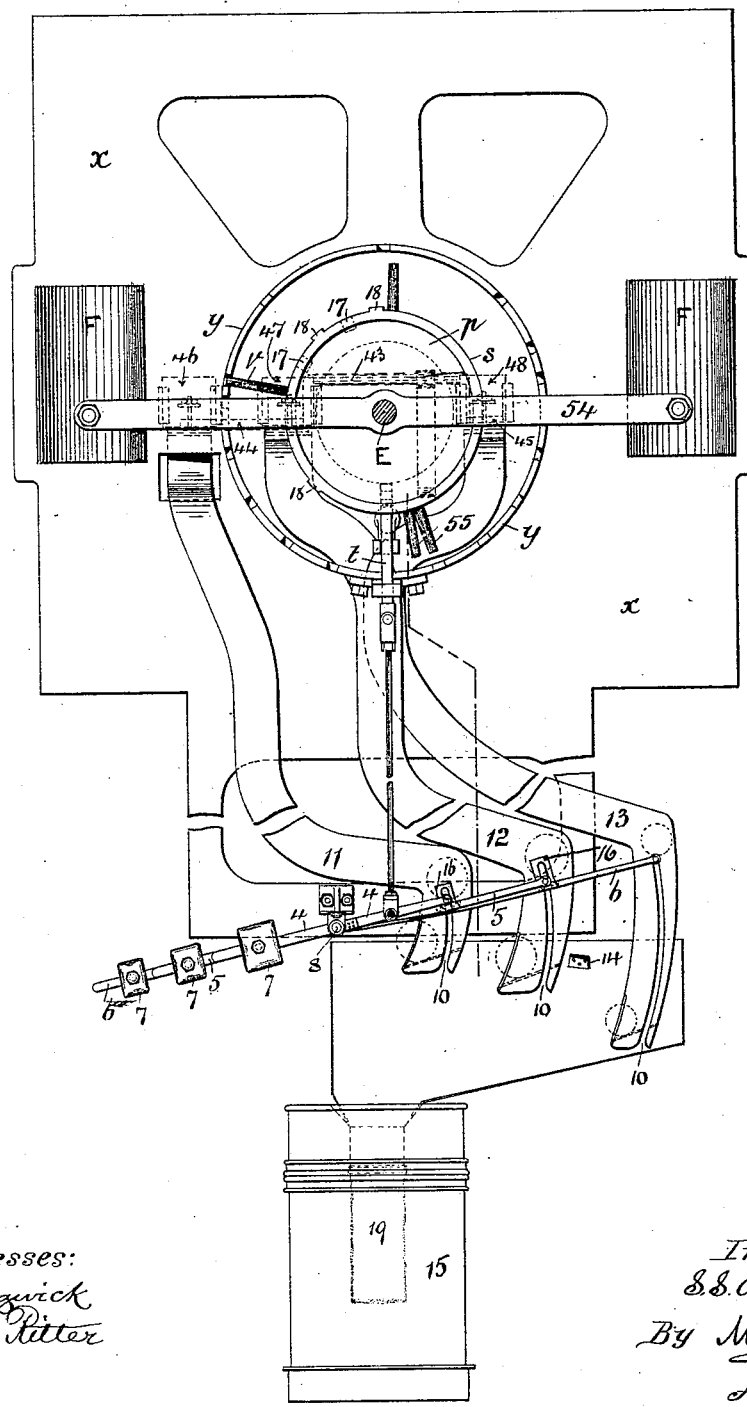
Figure 7:
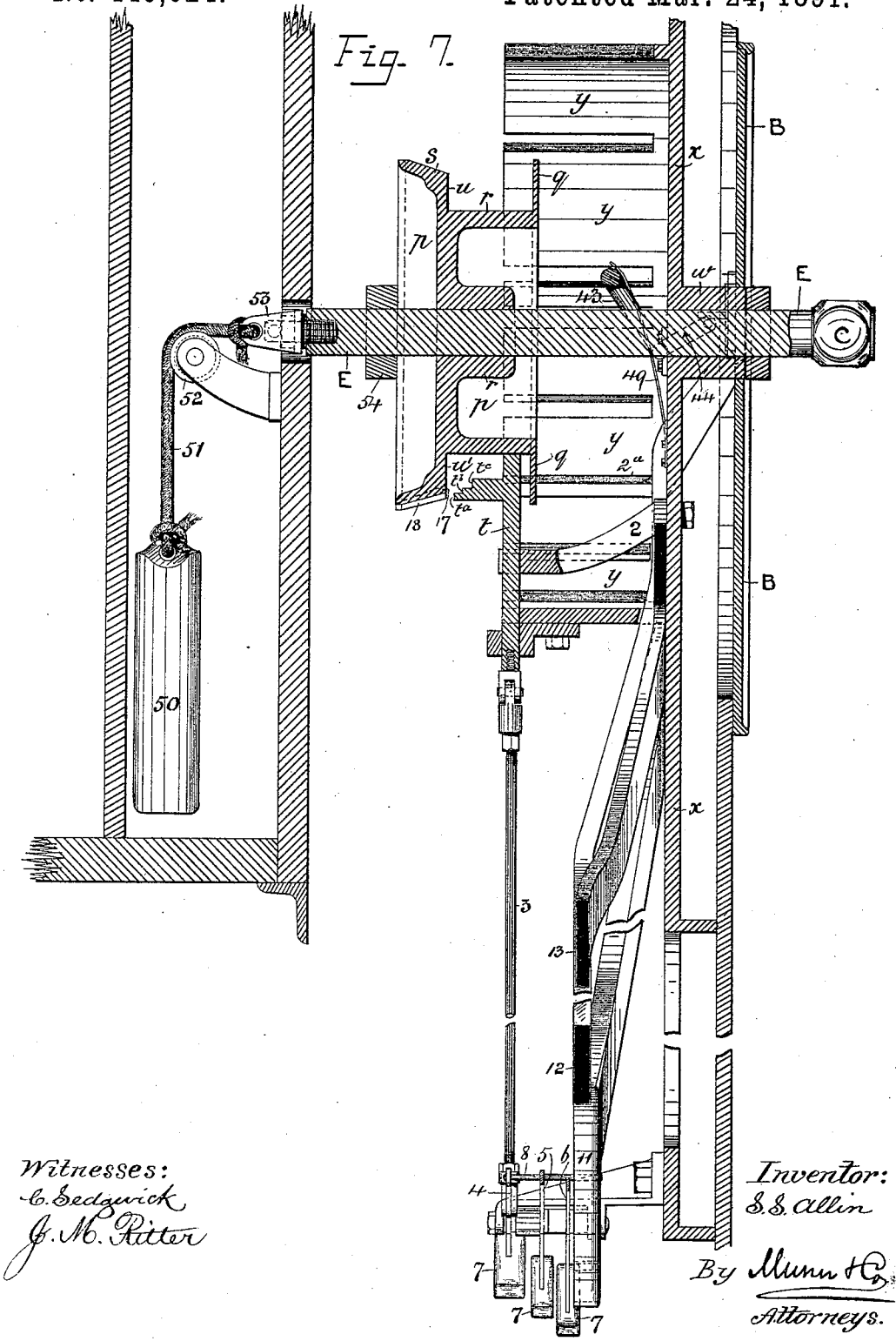
Figure 8:
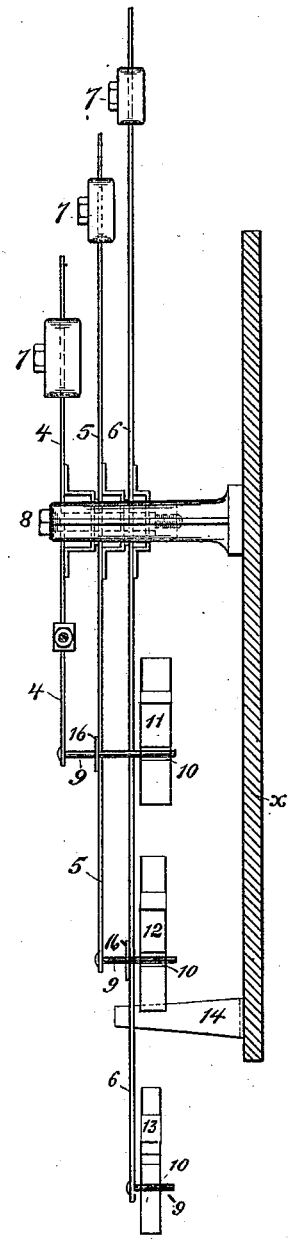
Figure 9:
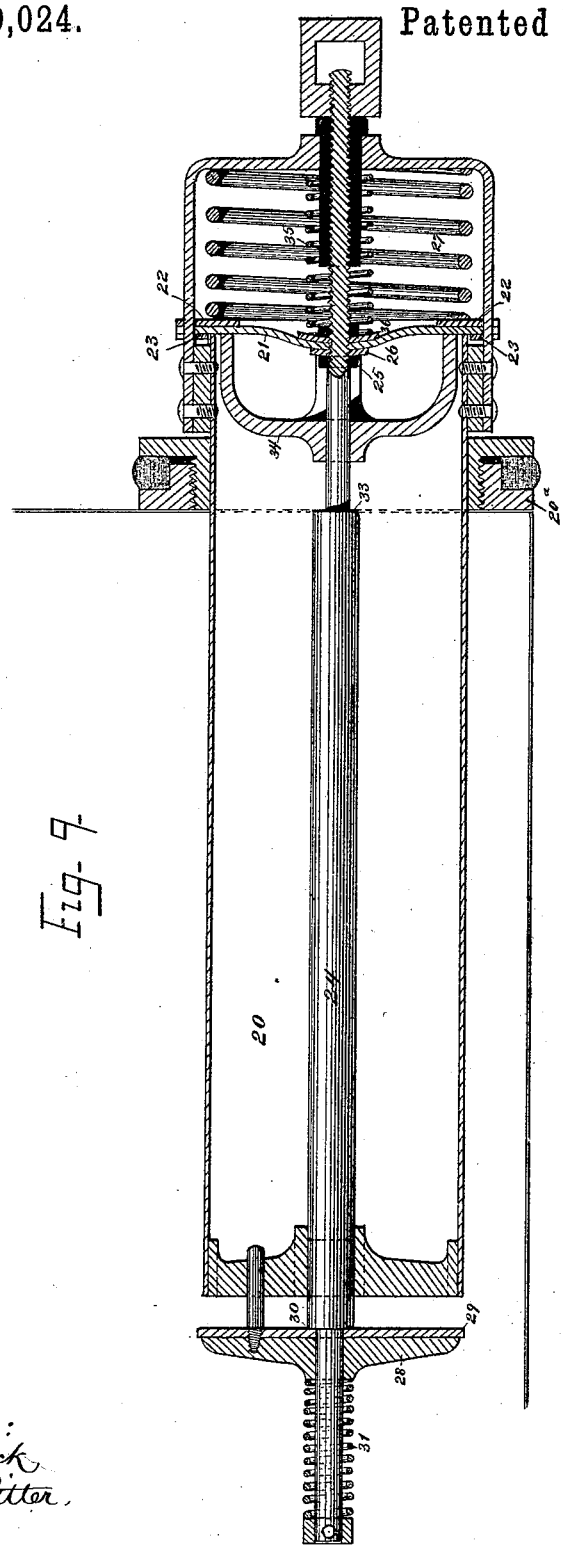
Figure 10:
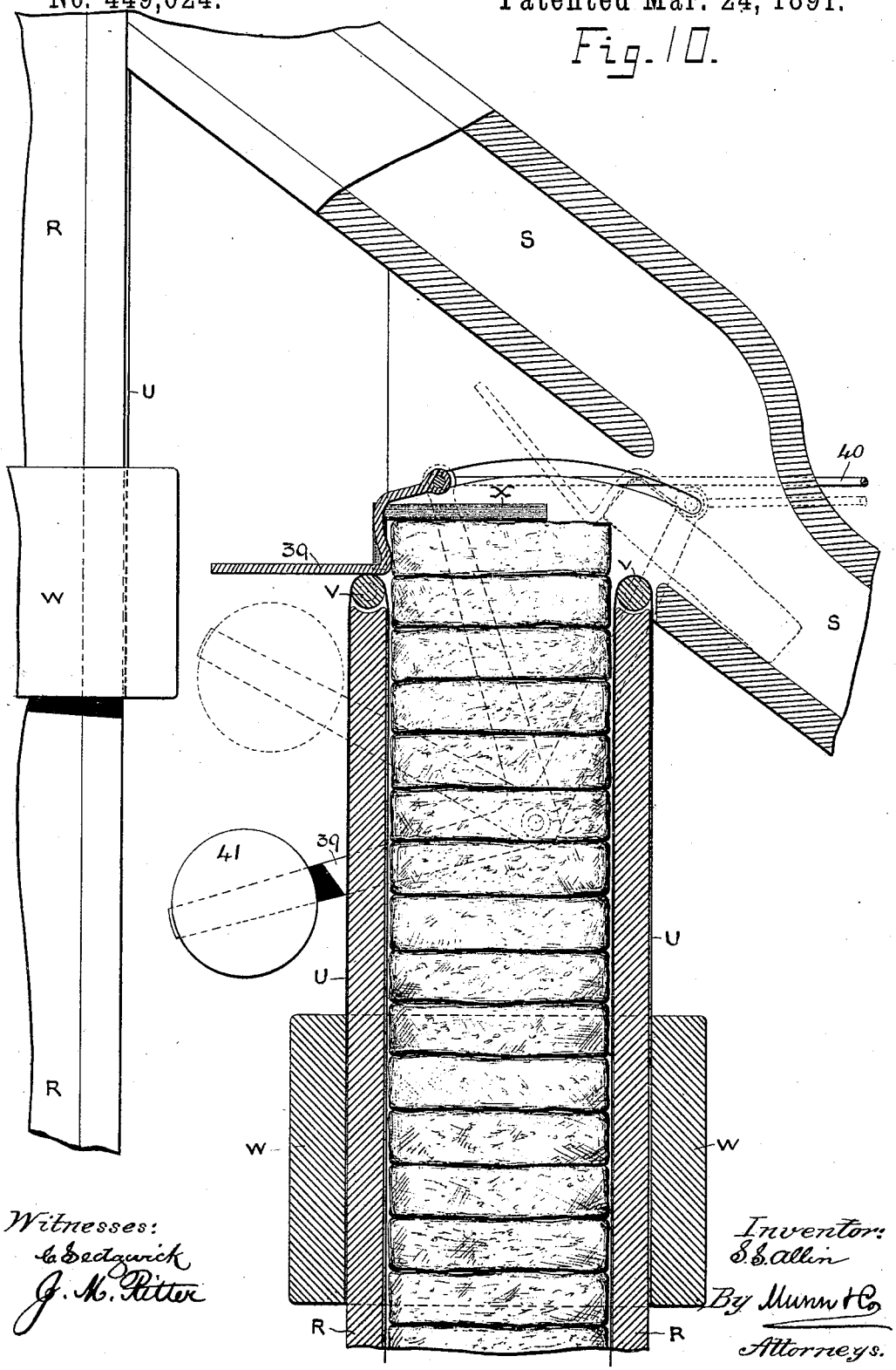
Figure 11:
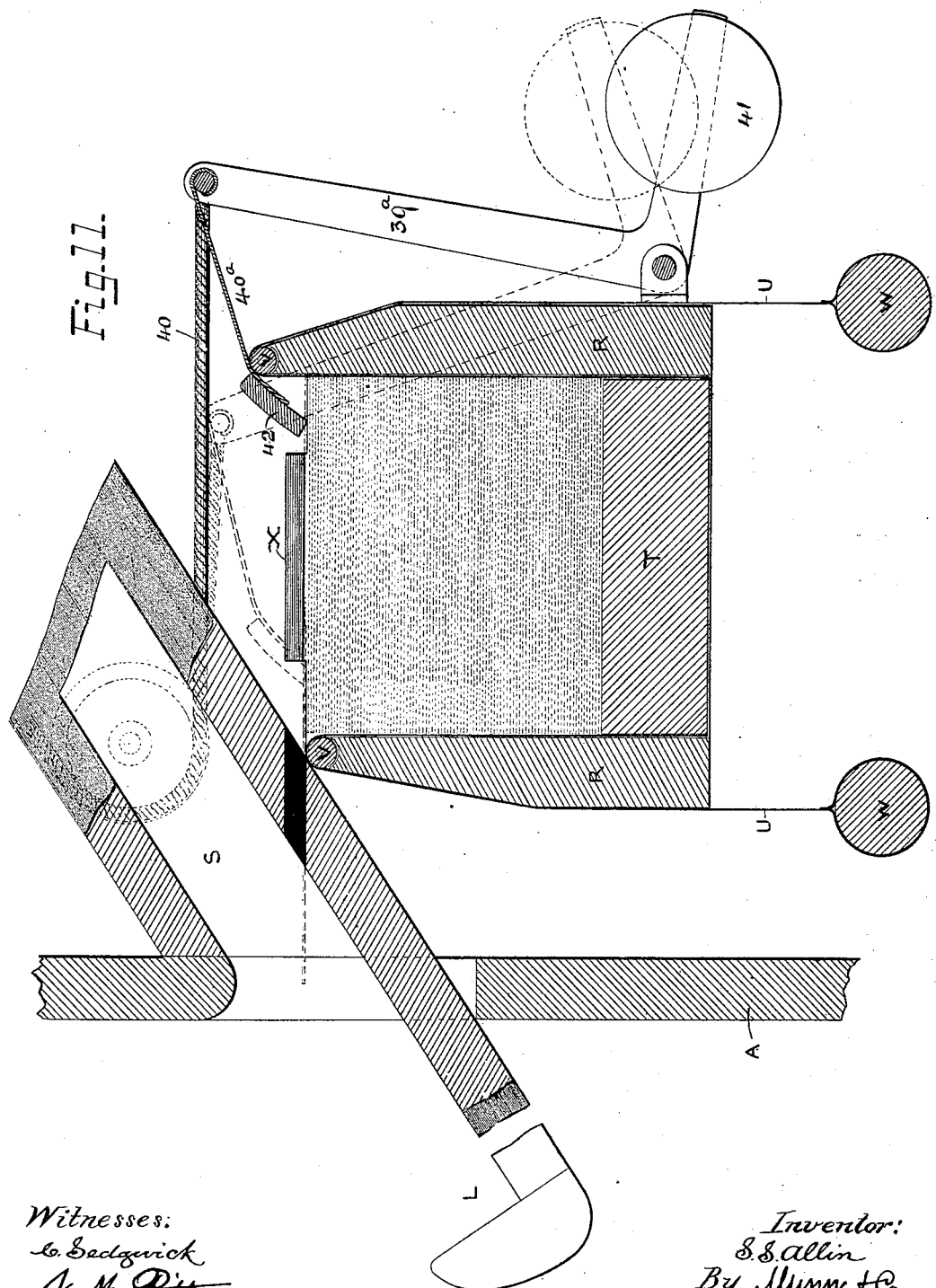
Figure 12:
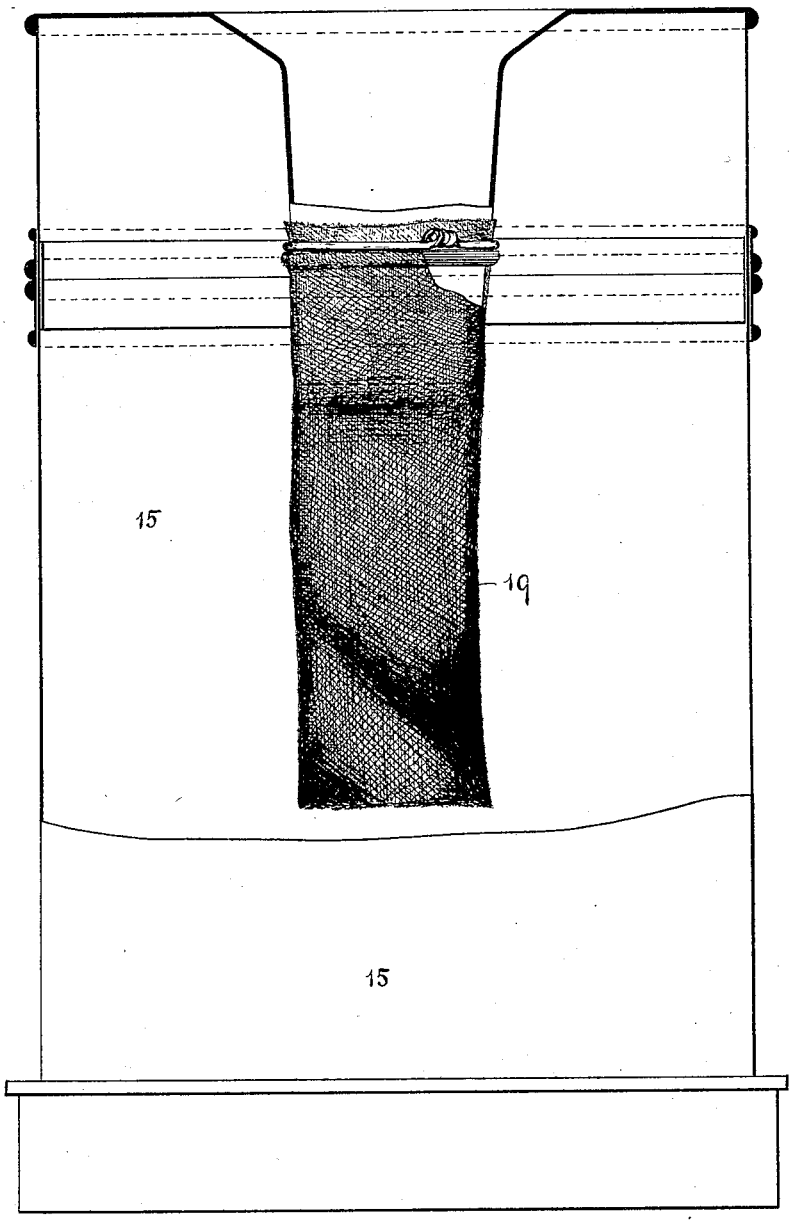
Figure 13:
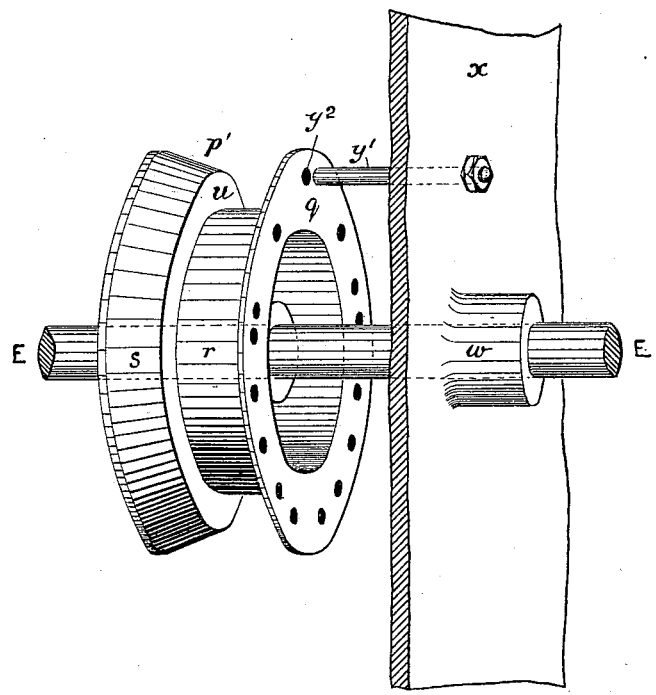

In the accompanying thirteen sheets of drawings, which illustrate a machine constructed according to my invention, Figure 1 is a perspective view of a machine constructed in accordance with my invention. Fig. 2 is a vertical sectional view thereof on the line $z$ $z$ in Fig. 3. Fig. 3 is a similar view thereof on the line $y$ $y$ in Fig. 2. Fig. 4 is a central vertical sectional view thereof. Fig. 5 is an elevation, on an enlarged scale, of a portion of the delivering mechanism behind the dial. Fig. 6 is a similar view, on an enlarged scale, of the coin-chutes and coin-levers behind the dial. Fig. 7 is a sectional elevation, on an enlarged scale, of the mechanism behind the dial shown in Fig. 4. Fig. 8 is an enlarged plan view, partly in section, of the coin-levers shown in Figs. 6 and 7. Fig. 9 is a sectional elevation, on an enlarged scale, of the measuring apparatus attached to each beverage-cistern. Fig. 10 is a similar view, on an enlarged scale, of the apparatus for delivering solid articles. Fig. 11 is a similar view, on an enlarged scale, of the apparatus for delivering post-cards. Fig. 12 is a similar view, on an enlarged scale, of the coin-box; and Fig. 13 is a perspective view, on an enlarged scale, of a modified construction of the mechanism behind the dial shown in Fig. 7.

Similar letters and figures of reference denote similar parts throughout the drawings.

The machine has an external case A, preferably of cast-iron, provided with suitable doors A' A$^2$ A$^3$ A$^4$ in the front, back, and sides for obtaining access to the receptacles for goods and the working parts. On the front of the case is a dial B, having marked all round it the names of the various articles on sale, and lines radiate from the center of the dial to each name. Under the name of each liquid is an opening with a little slide behind it bearing the words "Full" and "Empty." These slides are worked by suitably-arranged floats in the cisterns to show the condition of the contents of each cistern. The price of each article is marked close by its name. In the dial are slits, each marked to receive a certain price—as, for instance, 1 cent, 2 cents, 4 cents. In the center of the dial is a handle C and pointer D, both fixed to a shaft E, which passes into the interior of the machine. When it is desired to obtain any article out of the machine, the handle is turned till the pointer lies over the radial line indicating the article required, and on the necessary value in coin being passed through the proper slit the handle can be pulled out, and such pulling out actuates the internal mechanism to deliver the article in a manner to be presently described.

On the front of the machine, at each side of the dial, is a recess or cupboard F, containing a plated drinking-cup H, attached by a chain. Below the dial is a row of spring-taps J, each communicating with one of the cisterns, except one tap, which may be connected to the nearest water-main for supplying water for rinsing the cups or for a gratis supply. Below these taps is a basin K, and at each side of the basin is a slide L, on which solids are delivered.

The hot liquids supplied by the machine, as here illustrated, are tea, coffee, and cocoa; the cold liquids, iced filtered water, lemonade, and ordinary water, and the solids are ginger-beer essence (powder) and sherbet, both in cartridges, raspberry fruit syrup in small bottles, macaroons, biscuits, ices, cigarettes, pencils, post-cards, and stamped envelopes, with sheet of note-paper; but it is obvious that the machine is not necessarily limited to either the number or nature of the articles enumerated.

Internally the case A is divided into compartments. The uppermost compartment M contains three cisterns N N' N² for the liquids, which are intended to be kept hot—viz., tea, coffee, and cocoa. The walls and floor of this compartment are lined with suitable non-conducting material, and it extends from side to side of the case. Underneath is a smaller compartment P also lined with non-conducting material, and containing two cisterns Q Q' for the cold liquids—viz., filtered water and lemonade.

The lower portion of the case contains vertical cases R, in which the solid goods are stored. These cases are arranged in a series of five on each side of the cold cistern compartment P in an ascending scale, the highest being at the back of the case, and the lowest in front, close to the external delivering-slide L. The goods from each case are delivered from the top of the case onto a slide or series of inclined planes S, arranged in steps running down to the delivery-slide L, so that when any article is drawn from a case by the delivering mechanism it rolls or slides down the inclined planes to the external slide. The cases extend down to the floor of the machine on which they rest, and are filled with goods from the side either through the doors A² A³ in the sides of the case or from the center of the machine. The contents of each case rest on a sliding bottom T, fastened to broad tapes or bands U, which pass up inside the case at back and front and over rollers V at top to balance-weights W outside, which keep the contents pressed upward against stops X, so that an article is always at the top ready for delivery. The cisterns for liquids are preferably made of copper and tinned inside. They have a well $a$ at the bottom, in which lies a measuring apparatus. The cisterns N N' N² are each heated by small Bunsen gas-burners $b$, placed under them; but where gas is not obtainable suitable lamps may be employed. Each cistern is provided with a float $c$, which is restrained from rising to the surface by a cradle $c'$, and is placed behind the measuring apparatus and over the well $a$, into which it descends as the liquid is drawn off, and its under surface being shaped to fit the well it displaces almost all the liquid and so enables the cistern to be practically emptied. This float is free to rise and fall only two or three inches, and consequently does not come into action until the liquid in the cistern has fallen within a fixed distance from the bottom. The float is connected by a wire $d$ to a rock-lever $e$ at the top of the cistern. One arm of this lever is connected by a wire $f$ to the shutter $g$, which exhibits "Full" or "Empty" through the slot in the dial B. The connections are so arranged that when the fluid is run down nearly to the bottom the shutter is drawn up and the word "Empty" comes in view. In the case of the hot-cisterns N N' N² an arm of the rock-lever $e$ is connected by a rod $f'$ to the gas-cock $h$, so that as the fluid diminishes in level below the arranged point the flame is gradually lowered and finally extinguished. A screw-plug $i$ is provided at the bottom of the back of the well $a$ for draining off the contents when necessary.

The form of cistern-bottom shown in Fig. 2, with a well descending below a flat surface, is adapted for the double purpose of enabling the contents to be almost entirely drawn off and sold, as the measuring-vessel and the float, when it descends between them, nearly fill the well, and also of enabling heat to be applied under the flat surface, where it can act to best advantage. The floor $j$ of the hot compartment M is made of wood about three-fourths inch thick and coated with a layer of asbestus covered by tin-plate or zinc. The floor $k$ of the cold compartment P is also of wood, and is provided with a zinc or leaden tray $l$ to hold water for the purpose of producing evaporation, and to catch the drip from ice when used in hot weather. This compartment is lined with non-conducting material, and is provided with an overflow connected to the waste-pipe $m$ from the basin K. When ice is not employed, the cisterns Q Q' may be surrounded by fibrous cloth dipping into the water in the tray $l$, the constant evaporation from which chills the contents of the cistern in a manner well understood. The heated air from the upper compartment M escapes through the tubular knob $n$ on the top of the case, while fresh air is drawn in at suitable openings around the bottom of the case. Thus a current of air is established which promotes evaporation from the wet coverings of the cisterns Q Q' and supplies air to the burners $b$.

On the shaft E behind the dial B is fixed a circular hollow casting $p$, having three surfaces—viz., a flat annular disk $q$, a short cylinder $r$, and a short portion of a cone $s$ cut into steps. With this casting a detent $t$ engages, which, when in place, presses upward against the cylindrical part of the casting and in front of the flat end $u$ of the cone $s$, and so prevents the handle C being drawn forward; but when the detent is drawn downward varying distances by the weight of different coins acting on the different coin-levers it permits the handle C, shaft E, and casting $p$ to be drawn forward. In one side of the casting $p$ is fixed a radial bar or finger $v$, which lies precisely behind and in line with the pointer D on the dial, so that when the said pointer is placed on the line leading to the name of any article the bar $v$ is directly over the end of a lever, which when depressed by it effects a delivery of the said article. The shaft E is journaled in a bush $w$ in a cast-iron plate $x$, which carries the delivering-levers, and which is attached to the inside of the front of the case A, immediately behind the dial B. A circular guard-ring $y$ is cast on the plate $x$ concentric with the shaft E. Its diameter in the machine illustrated is ten inches. The object of this guard-ring is to prevent the handle C being pulled out, except when the finger $v$, which is long enough to reach the ring, is over the end of one of the levers before mentioned, and it can then only be brought forward when the detent $t$ has been withdrawn by the action of a coin. The said levers (marked $z$) work on fulcrums fixed on the plate $x$ round the shaft E, and their inner ends travel within slots in the guard-ring $y$.

Instead of the guard-ring, the arrangement shown in Fig. 13 may be employed. In this case a bar or finger $y'$ projects inward from the plate $x$, and by abutting against the disk $q$ prevents the handle being drawn out, except when the said bar or finger is opposite any one of a series of holes or notches $y^2$ in the disk $q$, cut to correspond with the levers $z$. In practice I prefer the guard-ring, as it furnishes a guide and support to the end of each lever.

The detent $t$ is a small vertical steel bar, with a head shaped as shown in Fig. 7, working freely in a bracket 2 and steadied by a guide $2^a$, fixed to the guard-ring, and is attached by a stiff wire 3 to the lever 4 underneath, on which the coins act. The object of the peculiar conformation of the head of the detent is the diminution of the idle stroke or movement of the handle C and delivery-finger $v$. If the detent were a plain bar, the handle could be at any time drawn forward the distance between the step $u'$ of the cone $s$ and the back of the detent before they come in contact and further motion was checked. This would be inconvenient, as it would permit an appreciable movement in the delivering mechanism of the various compartments, and would, besides, subject the detent to increased shocks on pulling the handle forward. The vertical edge of the cone is, as afterward to be described, cut into three steps corresponding to the three values of coins used, and the projection on the detent has also three steps $t^a$ $t^b$ $t^c$. When the pointer on the dial is turned to the name of an article price four cents and the handle pulled forward, (before the detent has been withdrawn by the deposit of four cents,) the cone strikes the lower step $t^a$ and the idle movement is very small. When the pointer is turned to a two-cent article and the handle pulled, the cone strikes the middle step $t^b$, and the idle stroke is a little longer. When the pointer is turned to a one-cent article, on pulling the handle the cone strikes the upper step $t^c$, and the idle stroke is still longer, but in every case very much less than if there had been no projections. In forming these projections it is necessary to insure that the angle from the top edge of the detent to the lowest step $t^a$ and from step to step with the vertical shall be less than any of the angles formed by the slope of any of the acting surfaces of the cone $s$.

The lever 4 is so balanced by the weight 7 that until the proper coin is inserted the detent is kept pressed upward against the cylindrical part $r$ of the casting $p$, and the step $u'$ between the cylindrical part and the conical part $s$, abutting against the detent, prevents the handle being drawn out, so long as the detent is kept in such position as before mentioned. The lever 4 consists in reality of three levers 4 5 6, all working on the same fulcrum 8 for the three different values of coin, and connected together, as presently to be described. The short lever 4 is for the highest value, the longer lever 5 for the intermediate value, and the longest lever 6 for the lowest value. The coins are not delivered directly onto the levers themselves, but on pins 9, fixed on and standing out horizontally at right angles from them, which said pins project through slots 10 in the coin-chutes 11 12 13. A part of each chute runs nearly horizontally for a certain distance immediately above the lever, in order to direct the descending coin against the bend of the chute, and so exhaust its momentum and cause the lever to be actuated by its weight alone. The pin 9 in the lever 4 passes across and rests upon the lever 5, and the pin 9 in the lever 5 passes across and rests upon the lever 6. When the proper coins—say four cents—drop on the pin in the lever 4, the said lever descends, carrying with it the detent $t$ and the levers 5 and 6, until it is stopped by a light spring 14, with which the lever 6 comes in contact, and on which it rests, still retaining the coin. The detent by this action has descended sufficiently to just clear the step $u'$ between the cylinder $r$ and cone $s$, so that the handle C can be pulled out. In pulling it out the cone $s$ passes over the detent and depresses further both it and the levers 4, 5, and 6 sufficiently to allow the coin to fall out of the chute 11 and drop into the coin-box 15, the spring 14 on which they rest yielding sufficiently to permit this. The levers, being thus released from the weight of the coin as soon as the handle goes back, raise the detent to its former position and lock the apparatus as before. When a coin—say a two-cent piece—drops down the chute 12 onto the lever 5, it would have no power to draw down the detent, but that this lever is provided with a short metal loop 16, extending from it to over the pin on the lever 4. This loop allows the lever 5 to move a short distance before it begins to move the lever 4 and with it the detent, so that the detent is not depressed so far as when a coin acts directly on lever 4.

Lever 6 is connected to lever 5 by a similar loop 16, and the proper coin—say a one-cent piece—on lever 6 therefore moves the detent a still less distance than when operated by lever 5. This arrangement enables me to provide for the delivery of articles of varying value by the same central mechanism, and I effect this in the following manner: The step $u'$, which separates the conical portion $s$ of the casting $p$ from the cylindrical part $r$, is the impediment which prevents the casting being drawn forward when the handle C is pulled out before the detent $t$ is withdrawn, as when drawn forward a little way it comes against the detent and is effectually stopped. As above explained, coins acting directly on lever 4 draw the detent down farthest, those acting directly on lever 5 draw it down a less distance, and those acting on lever 6 a still less distance. As each of these levers has not always (but at the proper time) to withdraw the detent sufficiently to permit the cone being drawn forward, it is obvious that the height of the step must be varied, and I do this by cutting down its front edge, as at 17, to the requisite depth at those points in the cone which are opposite the detent when the pointer on the dial is turned to an article whose price is one cent—for instance, or whatever the lowest price may be. When the pointer is opposite the name of one of the lowest-priced articles, the cone can be drawn forward and delivery effected by the deposit of its price or of a higher price acting on lever 6; but if it has been turned to the name of an article of higher price a higher portion of the step will be opposite the detent and no delivery will be made till it is moved to an article of the lowest price. Just the same occurs in the case of articles of intermediate value, say two cents. When two cents are dropped through the two-cent-coin slit onto lever 5, the detent being withdrawn further, a higher step can be used, and for convenience of construction I make this step the normal surface $s$ of the cone, adding a piece 18 to increase the height of the step at those points which are brought opposite the detent when the pointer is turned to the name of any article of the highest price, say four cents. It will thus be seen that while a lower-priced article can be obtained by the deposit of its price on the proper lever or of a higher price on any lever a higher-priced one can never be obtained by the deposit on any lever of anything less than the arranged price.

The coin-levers 4, 5, and 6 are necessarily so balanced by the weights 7 7 7 that if coins of too light weight are dropped in any of the chutes they will not be heavy enough to move the detent.

The coin-box is provided with a sleeve of textile material 19, through which the coin drops to prevent fraudulent abstraction of money from the box. (See Fig. 12.)

When the handle C is pulled out, the bar $v$ comes in contact with the end of one of the levers $z$ and delivers either a portion of liquid or a solid article in the following manner: Liquids are measured by an apparatus placed within the well $a$ of each cistern. This apparatus consists of a tube, preferably a copper cylinder 20, of the required dimensions, having a valve at each end. The tube 20 is tinned, as also are other parts of the measuring apparatus exposed to the action of the liquid. The outer valve is a rubber diaphragm 21, strengthened by a metal ring 22 at the back round its edge and riveted through a rubber to a narrower ring 23 on the front. This diaphragm is secured in the center to the rod 24 by a nut 25 and washer 26, and is kept against its seat by a spring 27. When this valve is closed, the inner valve normally stands open. This inner valve consists of a metal disk 28, faced with rubber 29. It is free to slide on the rod 24, and is kept against a shoulder 30 thereon by the spring 31. It stands about one-fourth of an inch off its seat, and thus permits the liquid to flow freely into the tube 20. The rod 24 is coupled to one of the levers $z$ by a connecting-rod 32. When the lever is depressed by the bar $v$, the rod 24 is drawn forward. The first one-fourth of an inch of this movement simply closes the inner valve 28 and prevents any more liquid flowing into the tube 20. A further movement of one-eighth of an inch takes place before the outer valve 21 begins to open, when the shoulder 33 comes against the cross-head 34 and draws it forward. This cross-head presses on the diaphragm 21 and pushes it open, the thrust of the cross-head being borne by the metal ring 22 and through it by the spring 27, which yields to the pressure. When the lever $z$ is released, the spring 27 closes the valve and the smaller interior spring 35, pressing against the washer 36, continues the motion of the rod 24, and so again opens the inner valve 28, thus permitting the tube 20 to refill. The measuring apparatus is held in place by being screwed into a ring $20^a$, fixed in front of the cistern, and projects forward into a metal receptacle 37, fixed in place below said cistern to receive its contents when discharged. This vessel is large enough to hold two deliveries of the measuring-vessel, and it is connected by a pipe 38 with one of the spring-taps J, by pressing on which the contents can be drawn off into one of the cups H. A similar arrangement is applied to each cistern, and the chief object of placing the measuring-vessel within the cistern is that its contents may always be kept at the same temperature as the rest of the liquid within the cistern whether it be hot or cold.

In the lower portion of the machine stand the vertical cases R, as before mentioned. A pawl-lever 39 is pivoted on the top of each case and connected by a wire 40 with one of the aforesaid levers $z$, so that when the lever is depressed the pawl pushes off the top article onto the inclined slide S, down which it rolls or slides and appears at L. The pawl-lever is returned to its normal position by a balance-weight 41, which also, through the connecting-wire, raises again the lever $z$. The pawl in returning to its place slips back over the next article, which has taken the place of that just delivered, being pushed up by the sliding bottom T, and is ready for the next delivery. In the case of post-cards and similar thin articles I prefer to employ a lever $39^a$, provided with an arm $40^a$, carrying a piece of rubber 42, (see Fig. 11,) which pushes forward the top card by frictional contact with its upper surface.

On the back of the plate $x$ a lever 43 is pivoted, having arms 44 45 projecting forward through the plate, one of which 44 is long enough to support two shutters 46 47, the other 45, carrying one shutter 48, working in slides on the back of the dial and opening or closing the coin-slits. This lever is kept away from the plate by its own weight, and in this position the arms 44 45 hold the shutters up, so that the coin-slits are open; but when the casting $p$ is drawn forward by the handle C after the deposit of a coin the lever 43 is pressed up to the plate by the disk-surface $q$ and the shutters 46 47 48 are lowered to close the slits, thus preventing any two or more actions of the machine from interfering with each other. The spring 49 serves the purpose of drawing the shaft E in again when the handle C is released; but as its force diminishes toward the end of its range a weight 50 is hung by a cord 51, passing over a pulley 52 and attached to a swivel-joint 53 at the end of the shaft to complete the return movement. The inner end of the shaft E is steadied by passing through a bearing on a cross-bar 54. When the return movement is completed, the detent $t$ rises and locks the apparatus, as before described.

In order that any person obtaining a fruit essence or other similar article may at the same time obtain iced water to mix with it, fingers 55 are fixed on the casting $p$, similar to but shorter than the finger $v$. The lever $z$ 56 of the iced-water cistern is longer than the rest of the levers and projects within the guard-ring $y$, so that it comes within reach of any of these short fingers, which are so situated on the casting $p$ that when the long finger $v$ is over a fruit-essence or other similar lever one of the short fingers is over the iced-water lever, and a measured quantity of iced water is thus drawn at the same time. The number of these short fingers necessarily corresponds with the number of articles sold which require to be mixed with water. I may also supply, for the use of any persons who may object to drink from the cups H, collapsible cups of paper, practically water-proof, which fold up flat, so that they can be stored in one of the vertical cases and delivered like post-cards or biscuits in return for a price paid, or, if desirable, delivered gratis in connection with any of the liquids in the same manner as water is given with sherbet, &c.

It will be obvious that many modifications may be made of the various portions of the apparatus described without departing from the essential principles of the invention—as, for instance, the cases for containing solids, which I have shown placed vertically, may be placed horizontally or at an angle, a similar construction and mode of feeding the goods to the delivering arrangement being retained. Similarly sliding pushers might be used, to deliver solids, instead of hinged pawls. Similar modifications of other parts might be made; but I have described in each case the arrangement I preferred to employ in practice, and I have not shown any mode of making visible the coin received, or of counting the money taken, or of giving notice when money was paid, though there are many known modes of doing these which I may, if desirable, incorporate with the machine.

What I claim as my invention, and desire to secure by Letters Patent of the United States, is—

1. In a coin-operated machine for delivering merchandise, the combination of a series of fixed receptacles for solid or liquid refreshments, or both, a series of coin-chutes and coin-operated levers, and a central delivery mechanism common to all of said receptacles and arranged to be set to deliver different articles by the insertion of different coins, substantially as and for the purpose described.

2. A coin-operated vending-machine consisting of a casing, a series of fixed receptacles for solid or liquid articles, a dial upon the outside of the casing for indicating the articles contained in the machine, a series of coin levers and chutes, a central delivery device common to all the receptacles formed with an operating-handle, and a pointer, said device arranged to revolve on a central axis, whereby its pointer can be turned to the desired article, and whereby such device will be in position to be drawn out to deliver the article as the proper coin is placed in the proper chute, all arranged substantially as and for the purpose described.

3. In a coin-operated vending-machine, the circular casting $p$, mounted to rotate on a central shaft within the machine simultaneously with the movement of a pointer outside of the machine, and having a cylindrical surface $r$ and a conical surface $s$, adapted to act upon the locking and releasing mechanism as said casting is rotated, substantially as set forth.

4. In a coin-operated machine for delivering merchandise, the combination, with the revoluble shaft E, and the pointer D on said shaft movable over the dial B outside of the machine, of the circular casting $p$, mounted on the inner end of said shaft and provided with the finger $v$ in alignment with said pointer, adapted as the pointer is placed over the name of an article on said dial to pass to position for actuating the lever for delivering said article, substantially as set forth.

5. In a coin-operated machine for delivering merchandise, the combination, with the revoluble shaft E, pointer D on said shaft, and the dial B, of the circular casting $p$, mounted on the inner end of said shaft and provided with the finger $v$ and the fingers 55, whereby as a delivery-lever is actuated by the finger $v$ to deliver a solid article the fingers 55 act to deliver a liquid immediately thereafter, substantially as set forth.

6. In a coin-operated machine for delivering merchandise, the combination, with the revoluble shaft E, and the circular casting $p$ on the inner end of said shaft, provided with the finger $v$, of the fixed guard-ring $y$, concentric with the shaft E, whereby the finger $v$ is prevented from being drawn forward, except when it is over the end of one of the coin-levers, substantially as set forth.

7. In a coin-operated machine for delivering merchandise, the combination, with the plate $x$, the revoluble sliding shaft E, the circular casting, and the disk $q$, of a guard mechanism between the plate $x$ and said disk, consisting in a circular series of openings concentric with said shaft, and a bar or finger, whereby when any one of the openings and the bar or finger register the shaft may be drawn out, substantially as set forth.

8. In a coin-operated machine for delivering merchandise, the combination, with the revoluble shaft E and the coin-levers 4 5 6, of the circular casting $p$ on the inner end of said shaft, having the conical surface $s$, adapted as said casting is revolved to engage and depress said coin-levers and discharge the coin therefrom, substantially as set forth.

9. In a coin-operated machine for delivering merchandise, the combination, with the revoluble shaft E and the circular casting $p$ thereon, having the conical surface $s$ and cut into steps, of the detent $t$, having steps $t^a$, $t^b$, and $t^c$ thereon, adapted to engage the conical surface of said casting and lessen the idle movement or stroke of said shaft, substantially as set forth.

10. In a coin-operated machine for delivering merchandise, the combination, with the revoluble shaft E and the circular casting $p$ thereon, of the detent $t$ and the coin-levers 4 5 6, whereby as coins fall upon said levers the latter withdraw the detent to varying distances from said casting, substantially as set forth.

11. In a coin-operated machine for delivering merchandise, the combination, with the revoluble shaft E and the circular casting $p$ on said shaft, having a conical surface cut in steps of varying height, comprising the normal surface $s$, the recesses 17, and the projections 18, of the coin-levers 4 5 6 and the vertically-movable stepped detent $t$, adapted to engage the steps on said casting, whereby as said casting is revolved it is released by variations in the descent of said detent corresponding to the varying value of the coins dropped upon said levers, substantially as set forth.

12. In a coin-operated machine for delivering merchandise, the combination, with the revoluble shaft E, the stepped casting $p$ thereon, the stepped detent $t$, and the coin-levers 4 5 6, of the spring 14, adapted to support said levers when depressed by a coin to hold said detent withdrawn from the casting until the desired article is delivered, and to then further yield and permit the discharge of the coin from said levers, substantially as set forth.

13. In a coin-operated machine for delivering merchandise, the combination, with the revoluble shaft E, having the handle C, and the circular casting $p$ on said shaft, having the disk-surface $q$, of the lever 43, pivoted on the back of the plate $x$ at the front of the machine, the arms 44 45, carried by said lever and projecting through said plate, the shutters 46 47, carried by the arm 44, and the shutter 48, carried by the arm 45, whereby as the casting is drawn toward said plate said shutters are lowered to close the coin-slots, substantially as set forth.

14. In a coin-operated machine for delivering merchandise, the combination, with the revoluble shaft E, having the handle C, the circular casting $p$ on said shaft, having the disk-surface $q$, and the lever 43, pivoted on the back of the plate $x$ at the front of the machine and carrying the arms 44 45, said arms projecting through said plate and carrying the shutters 46 47 48, of the spring 49 and the weight 50, connected to the inner end of said shaft, whereby the shaft is drawn into the machine and the shutters are raised to open the coin-slots, substantially as set forth.

15. In a coin-operated vending-machine, the combination, with the cisterns N, N', $N^2$, Q, and Q' for containing hot and cold liquids and having a bottom formed with a well for said liquids, and a series of coin-operated levers arranged to be put in connection with said cisterns by the different coins, of a central delivery-operating device common to all the cisterns and coin-levers, said device arranged whereby it can be turned and set for operation with the coin-levers and any particular one of said cisterns, substantially as and for the purpose described.

16. In a coin-operated vending-machine, the combination, with the fixed cisterns N, N', $N^2$, Q, and Q' for containing hot and cold liquids, and measuring devices placed in said cisterns, said devices connected with the delivery-pipes, and the coin-operated levers, of a central delivery-operating device common to all the cisterns and arranged for connection with all the measuring devices, said delivery-operating devices mounted to turn on a central axis, whereby it can be turned and set to operate any one of the cisterns and its measuring devices when the proper coin is inserted, substantially as and for the purpose described.

17. In a coin-operated vending-machine, the combination, with the cisterns N, N', N², Q, and Q' for hot and cold liquids, the measuring devices held in said cisterns formed with valve-rods 24, and the coin-operated levers, of the delivery-operating mechanism formed with a series of levers $z$, connected with said valve-rods 24, said mechanism adapted to be set in operative connection with the coin-levers when the proper coin is inserted, whereby the levers $z$ will act on the valve-rods 24, substantially as and for the purpose described.

18. In a coin-operated vending-machine, the combination, with the cisterns N N' N² for containing hot liquids, of a float or floats held in said cisterns, having a definite range of motion therein, and a delivery-operating device common to all the cisterns, said device arranged to bleed off said cisterns when released and adjusted, a burner or other heating device arranged beneath said cisterns, and intermediate crank-lever connections between said floats and the valves of the burners or heaters, said connections adapted to automatically cut off the burners when the liquid in the cistern is automatically emptied by means of the delivery-operating devices, substantially as and for the purpose described.

19. In a coin-operated vending-machine, the combination, with the cisterns N N' N² Q Q', having wells $a$ in their bottoms, and a delivery-operating device common to all the cisterns, of floats operating in said cisterns, a shutter having the words "Full" and "Empty" arranged on the outside of the dial of the machine, and intermediate bell-crank-lever devices between the floats and said shutter, whereby the shutter will be moved to display the word "Full" when the cisterns are filled and "Empty" when the fluid is automatically drawn off by the operation of the delivery apparatus, substantially as and for the purpose described.

20. In a coin-operated machine for delivering merchandise, the combination, with the goods-receptacles R for holding dry and solid articles and in which the same fit loosely, upwardly-pressing followers or bottoms T, operating to normally force said articles upward, and stops on the upper ends of the receptacles for limiting the upward movement of said articles, of the delivery-operating disk $p$, formed with a series of projections $v$, a series of levers $z$, pivoted to the front frame, and weighted pusher arms or pawls 39, connected with the levers $z$, said arms adapted to engage the uppermost article in said receptacles R and force the same into the delivery-chute as said pawls 39 are operated by the operation of the disk $p$ and its connection with the levers $z$, all arranged substantially as and for the purpose described.

21. In a coin-operated machine for delivering merchandise, the combination, with a series of casings R, constructed and arranged substantially as described and shown, of the chute S, constructed in a series of inclined steps, adapted to receive the articles discharged from said casings and conduct them to the external delivery-slide L, substantially as shown and described.

22. In a coin-operated machine for delivering merchandise, the combination, with a series of fixed receptacles for solid and liquid articles, the central shaft E, the circular stepped casting $p$ on said shaft carrying the fingers $v$ and 55, and the guard-ring $y$, secured to the inner face of the machine concentric with said shaft, of the series of levers $z$, grouped around said guard-ring and working in suitable slots therein, and each adapted to deliver goods from a different receptacle, substantially as herein set forth.

S. SEALY ALLIN.

Witnesses:
JOHN D. VENN,
W. F. MILLER.